G. R. COOKE.
VEHICLE TOP.
APPLICATION FILED FEB. 19, 1914.

1,150,811.

Patented Aug. 17, 1915.

Witnesses
M. A. Jones

Inventor,
George R. Cooke,

By Frank Fuller
Attorney.

UNITED STATES PATENT OFFICE.

GEORGE R. COOKE, OF JACKSON, MICHIGAN.

VEHICLE-TOP.

1,150,811.    Specification of Letters Patent.    Patented Aug. 17, 1915.

Application filed February 19, 1914. Serial No. 819,626.

*To all whom it may concern:*

Be it known that I, GEORGE R. COOKE, a citizen of the United States, residing at Jackson, in the county of Jackson and State of Michigan, have invented certain new and useful Improvements in Vehicle-Tops, of which the following is a specification.

Figure 1:
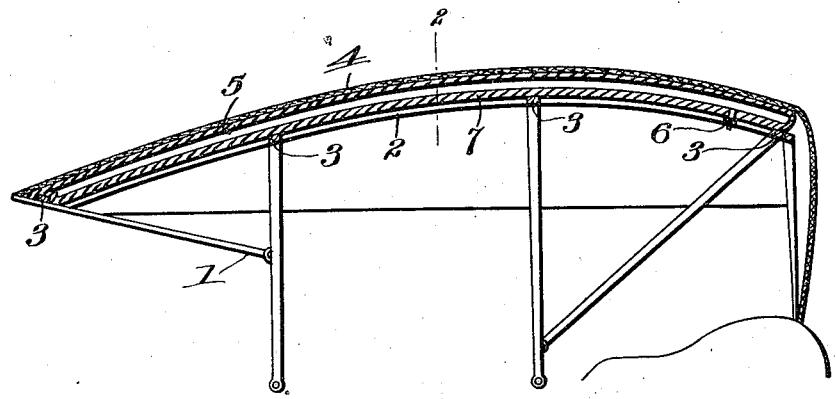
Figure 2:
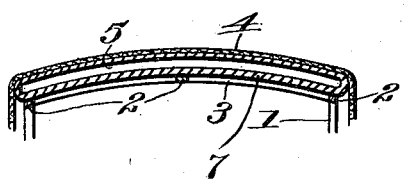

My invention relates to improved padding means for the tops of vehicles and it aims to provide a construction wherein the cover will be padded evenly at all times without projection of frame parts therethrough or thereagainst, in order that the top may present a neat appearance; to provide a device of this nature that will dispense with the use of means to support padding additional to the frame for the top, and to provide the device in the form of an inflatable envelop. In illustrative drawing accompanying this application, showing one form, Figure 1 is a longitudinal sectional view through a vehicle top with my improved envelop padding the cover, and, Fig. 2 is a section on the line 2—2 of Fig. 1.

In referring specifically to the drawings, 1, designates generally the skeleton top frame structure of a vehicle which has usual longitudinal strips 2 and transverse strips 3 and a cover 4. Said cover 4 is so fastened and distanced from the frame that an inflatable envelop 5 may be removably inserted and positioned intermediate the top of the cover 4 and the strips 2 and 3 resting on the strips and being supported in place solely thereby. A valve 6 is provided on the envelop to permit inflation. It should be noted that the lower wall of the envelop designated 7 is thicker than the upper wall. In transverse shape the envelop may be curved as shown to correspond with the shape of the frame and cover. This device is designed to take the place of the ordinary hair, excelsior or similar padding for the purpose this invention is designed for, in order to have a construction that will not permit the ends projecting therethrough or thereagainst resulting in misshaping of the cover and in order to provide a water proof top. In use when the envelop is inserted it is preferably in deflated condition and after insertion is inflated.

The bottom wall 7 is made heavy in order that it will effectively retain the shape against sagging and render it unnecessary to provide strips, straps, webs and the like, additional to the frame and envelop to support the envelop in position. Said envelop is of any desired flexible material, for instance rubber or rubber covered fabric.

I claim:—

1. In combination with a vehicle top frame and a cover, an inflatable waterproof envelop therebetween and in contact therewith, said envelop serving the dual purpose of rendering the vehicle top waterproof and of providing a shape-preserving means for the cover.

2. In combination with a vehicle top frame, and a cover having a portion distanced therefrom and a removable waterproof inflatable envelop between and in contact with said frame and cover.

3. In combination with a vehicle top frame, and a cover, an inflatable waterproof envelop therebetween and in contact therewith, for the purpose specified, having an upper and lower wall, one wall being thicker than the other, for the purpose specified, said envelop serving the dual purpose of rendering the vehicle top waterproof and of providing a shape-preserving means for the cover.

4. In combination with a skeleton vehicle top frame, and a cover, an inflatable waterproof envelop therebetween and in contact therewith, for the purpose specified said envelop being provided with a valve, said envelop serving the dual purpose of rendering the vehicle top waterproof and of providing a shape-preserving means for the cover.

5. In combination with a skeleton vehicle top frame curved at its top and a cover thereon having a portion distanced from the top, an inflatable envelop between said frame and cover provided with upper and lower curved walls the lower wall being thicker than the upper wall and resting on the frame and a valve in said envelop.

In testimony whereof I affix my signature in presence of two witnesses.

GEORGE R. COOKE.

Witnesses:
 JOHN S. LOVE,
 LEWIS BALLINGER.